US006745386B1

(12) United States Patent
Yellin

(10) Patent No.: US 6,745,386 B1
(45) Date of Patent: Jun. 1, 2004

(54) SYSTEM AND METHOD FOR PRELOADING CLASSES IN A DATA PROCESSING DEVICE THAT DOES NOT HAVE A VIRTUAL MEMORY MANAGER

(75) Inventor: Frank N. Yellin, Redwood City, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/522,268

(22) Filed: Mar. 9, 2000

(51) Int. Cl.[7] .............................. G06F 9/44; G06F 9/45
(52) U.S. Cl. ...................... 717/166; 717/139; 717/140
(58) Field of Search ................................. 717/139, 116, 717/140, 148, 162, 165, 166

(56) References Cited

U.S. PATENT DOCUMENTS

| 5,548,759 A | * | 8/1996 | Lipe ........................... 707/100 |
| 5,692,047 A | * | 11/1997 | McManis ..................... 713/167 |
| 5,815,718 A | * | 9/1998 | Tock ........................... 717/166 |
| 5,946,487 A | * | 8/1999 | Dangelo ..................... 717/148 |
| 5,950,008 A | * | 9/1999 | van Hoff .................... 717/139 |
| 5,966,542 A | * | 10/1999 | Tock ........................... 717/166 |
| 6,223,346 B1 | * | 4/2001 | Tock ........................... 717/166 |
| 6,530,080 B2 | * | 3/2003 | Fresko et al. ............... 717/166 |

FOREIGN PATENT DOCUMENTS

| EP | 0 913 769 A2 | 6/1999 | ............. G06F/9/44 |
| EP | 0 940 751 A1 | 9/1999 | ............. G06F/9/46 |
| WO | WO 99/31576 | 6/1999 | ............. G06F/9/00 |
| WO | PCT/US01/07497 | 10/2001 | |

OTHER PUBLICATIONS

Red Brick Systems, Inc. "Red Brick Systems White Paper; Decision–Makers, Business Data and RISQL® " © Copyright 1996–1998, PN 660010 2/97.

* cited by examiner

Primary Examiner—Antony Nguyen-Ba
(74) Attorney, Agent, or Firm—Morgan, Lewis & Bockius

(57) ABSTRACT

An authoring system prepares a specified set of classes for preloading in client devices lacking a virtual memory manager. The authoring system converts the specified set of classes into a plurality of resource modules, a subset of the resource modules each including items that have pointers to items in other ones of the resource modules. The authoring system generates a load module, for loading into the client devices, that includes the plurality of resource modules, an interpreter and a startup procedure. The interpreter is for executing, on the client devices, programs in a predefined computer language. The specified set of classes includes methods in the predefined computer language. The startup procedure is for execution by the client devices when loading the interpreter for execution. The startup procedure replaces pointers in the resource modules with updated pointers in accordance with actual memory locations of the resource modules in any particular one of the client devices. The resource modules include a class table resource module, a method table resource module, a field table resource module, a constant pool resource module and a string resource module. The class data structure includes pointers to items in the method table, field table and constant pool resource modules, the field table resource module includes pointers to items in the string resource module, and the constant pool resource module includes pointers to items in the field table resource module and items in the string resource module.

32 Claims, 11 Drawing Sheets

Memory Map for Client Device

Native Methods Table
320

| Native Method | Method Table Offset | Client Memory Location |
|---|---|---|
| Disk I/O | | |
| Screen Display | | |
| Read keyboard | | |
| Http Read | | |
| ... | | |

FIG. 6

Load Module for client device
a/k/a Resource Modules
162 / 158

| | |
|---|---|
| 350 | Table of Contents |
| 352 | Interned String Table |
| 354 | UTF String Table |
| 356 | Class Table |
| 358 | Method Tables |
| 360 | Field Tables |
| 362 | Constant Pool |
| 364 | Handler Tables |
| 366 | Interface Tables |
| 368 | Code (bytecodes of methods) |
| 370 | Static Data Table |
| | ... |

FIG. 7

Table of Contents 350

| Module | Client Memory Location | Size | (used in working copy only) ΔLocation |
|---|---|---|---|
| Interned String Table | | | |
| UTF String Table | | | |
| Class Table | | | |
| Method Table | | | |
| Field Table | | | |
| Constant Pool | | | |
| Handler Table | | | |
| Interface Table | | | |
| Code | | | |
| Static Data Table | | | |
| Key values | | | |

Object Of Type Java.Lang.String

SYSTEM AND METHOD FOR PRELOADING CLASSES IN A DATA PROCESSING DEVICE THAT DOES NOT HAVE A VIRTUAL MEMORY MANAGER

The present invention relates generally to computer systems and devices that execute programs written in object oriented computer languages such as Java, and particularly to a system and method for preloading a set of classes in such a device.

BACKGROUND OF THE INVENTION

In computer systems that execute Java programs, or programs in other object-oriented languages that support runtime program linking, the set of computer programs to be executed is dynamically determined, loaded and linked at run time. While this is very flexible, and makes it particularly easy to use software loaded from remotely located computers, the loading and linking of a basic set of class files needed to support basic data processing operations can be time consuming, and expensive in terms of memory resources, especially in small client devices whose computational power and memory resources are much more limited than typical desktop computers.

This problem is addressed in U.S. Pat. No. 5,815,718, issued Sep. 9, 1998 to Theron Tock and assigned to Sun Microsystems, Inc. The '718 patent is particularly focused on preloading class files into read only memory (ROM), for use in client devices having very limited read/write memory resources. Such devices use ROM to store a significant portion of their software.

The present invention is directed to related but somewhat different problem—preloading class files into a client device that does not have a virtual memory manager. Another problem addressed by the present invention is how to rearrange the data structures of a virtual machine (e.g., a Java program verifier, class loader, interpreter and associated security procedures) so that they can be executed in a client device that limits the maximum size of any one data structure. For instance, the maximum size of a resource may be 64K bytes.

SUMMARY OF THE INVENTION

An authoring system prepares a specified set of classes for preloading in client devices lacking a virtual memory manager. The authoring system converts the specified set of classes into a plurality of resource modules, a subset of the resource modules each including items that have pointers to items in other ones of the resource modules. The authoring system generates a load module, for loading into the client devices, that includes the plurality of resource modules, an interpreter and a startup procedure. The interpreter is for executing, on the client devices, programs in a predefined computer language. The specified set of classes includes methods in the predefined computer language. The startup procedure is for execution by the client devices when loading the interpreter for execution. The startup procedure replaces pointers in the resource modules with updated pointers in accordance with actual memory locations of the resource modules in any particular one the client devices.

Another aspect of the present invention is a client device having a data processing unit, a user interface and memory for storing an operating system, lacking a virtual memory manager, as well as the aforementioned resource modules, the interpreter and startup procedure.

In an embodiment of the invention, the resource modules include a class table resource module, a method table resource module, a field table resource module, a constant pool resource module and a string resource module. The class data structure includes pointers to items in the method table, field table and constant pool resource modules, the field table resource module includes pointers to items in the string resource module, and the constant pool resource module includes pointers to items in the field table resource module and items in the string resource module.

In an embodiment of the invention, the startup procedure includes instructions for positioning a first data structure in each of at least two of the resource modules in the subset at a 0 mod 4 address within any particular one of the client devices.

In an embodiment of the invention, resource modules include a table of contents indicating a memory address for each of a second subset of the resource modules, the second subset including those of the resource modules pointed to by at least one of the pointers in the resource modules. The startup procedure includes instructions for (A) determining a current memory address for each of the resource modules in the second subset, determining a differential value for each resource modules in the second subset corresponding to a difference between the current memory address and the memory address indicated in the table the table of contents, and (B) adjusting at least a subset of the pointers in the resource modules in accordance with the differential values.

In an embodiment of the invention, the resource modules include a methods table module having pointers to code for methods of the specified set of classes, and a subset of the pointers in the methods table point to native methods in the compiled interpreter.

BRIEF DESCRIPTION OF THE DRAWINGS

Additional objects and features of the invention will be more readily apparent from the following detailed description and appended claims when taken in conjunction with the drawings, in which:

FIG. 6 depicts a native methods table data structure.

FIG. 7 depicts a load module, also known as a set of Resource Modules.

DESCRIPTION OF THE PREFERRED EMBODIMENTS

Figure 1:
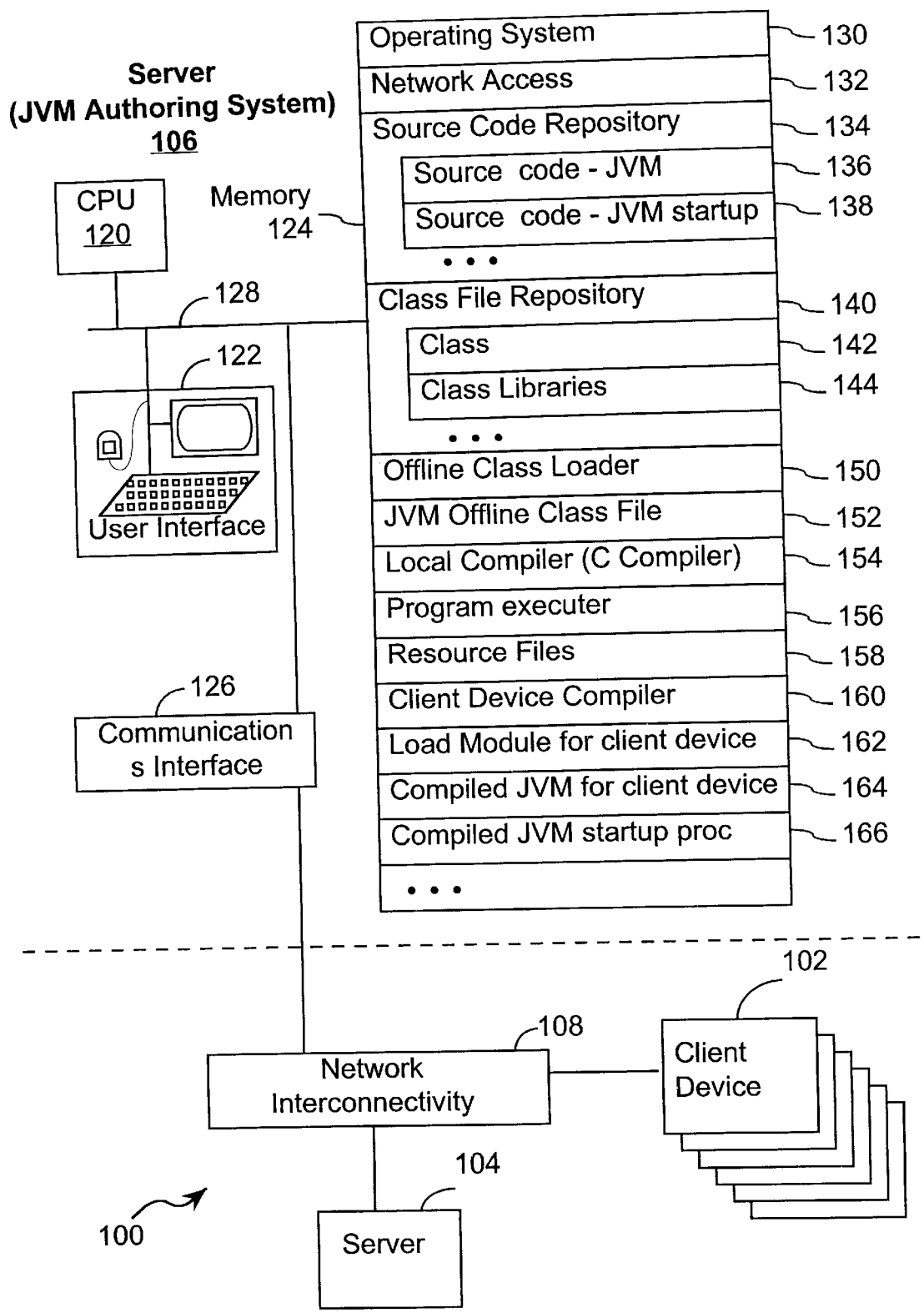
FIG. 1 is a block diagram of a Java Virtual Machine (JVM) authoring system.
Figure 2:
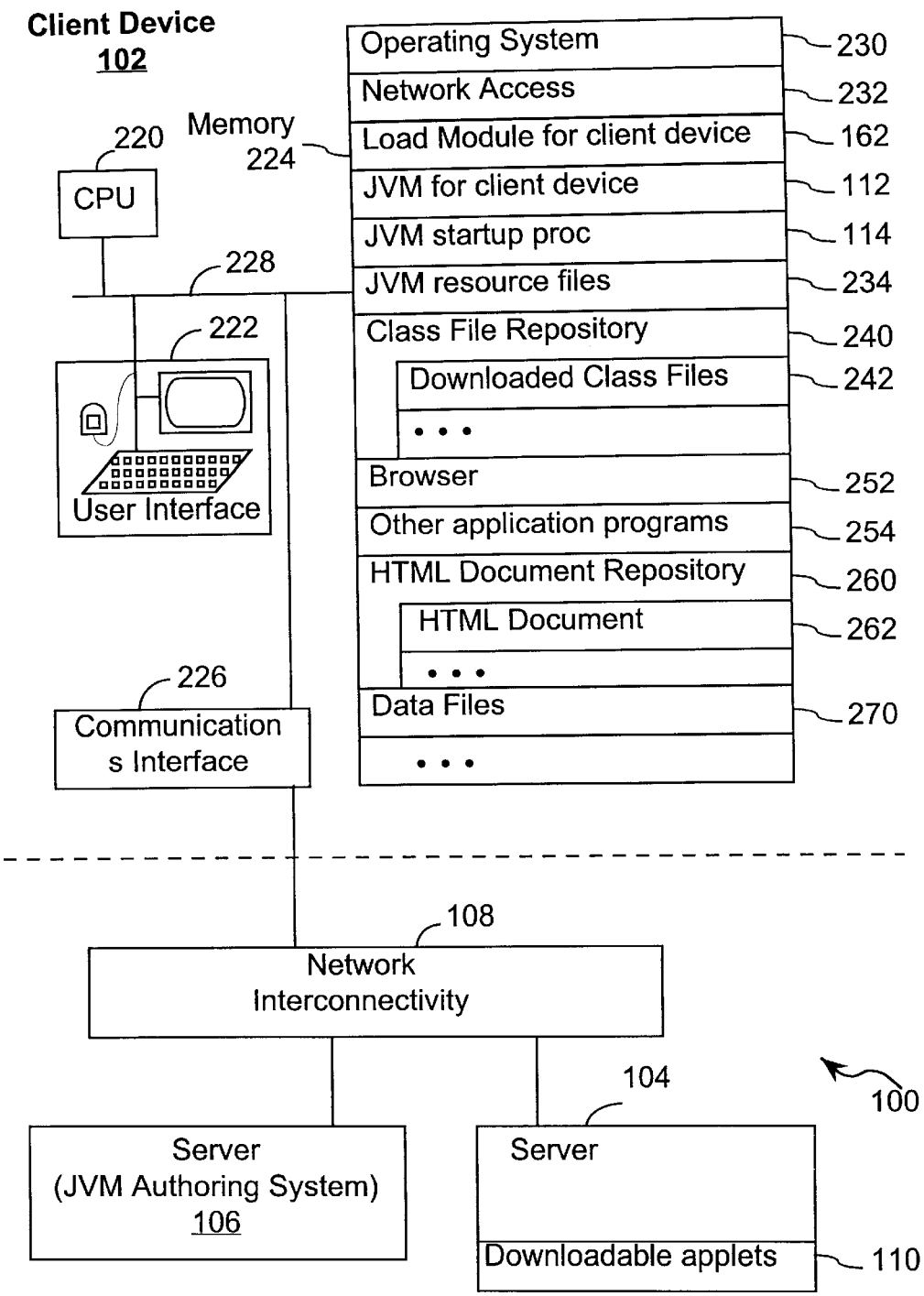
FIG. 2 is a block of a client device in which the JVM is executed with a set of preloaded classes.

Referring to FIGS. 1 and 2, there is shown a distributed computer system 100 having client devices 102, at least one server computer 104, an authoring system 106, and one or more communications networks or connections 108 that interconnect the various client devices 102, server computers 104, and authoring system 106. The client devices 102 may include a variety of types of computer and computer controlled devices, including handheld devices such as personal digital assistants (PDA's), embedded devices, desktop computers and so on. The server computers 104 store documents and downloadable applets 110 that may be accessed by the client devices.

The communications network or connection 108 may be as simple as a serial cable or infrared serial connection between a server and client device, or may include a local area network or Internet network connection.

In a preferred embodiment, at least some of the client devices 102 are configured to execute Java (a trademark of Sun Microsystems) language programs and applets, using a program interpreter know as the Java Virtual Machine (JVM) 112 (a trademark of Sun Microsystems). The JVM 112 in this embodiment is a special version of the Java Virtual Machine (sometimes called the "KVM" to indicate that it is for use by small devices) that is designed for execution by client devices that do not have a virtual memory manager as part of their operating system, and which furthermore have size restrictions on the amount of active memory that can be used by any executing program.

The role of the authoring system 106 is to generate a set of preloaded class files for use in client devices lacking a virtual memory manager as part of their operating system, and which furthermore have size restrictions on the amount of active memory that can be used by any executing program. For the remainder of this document, the term "client devices" shall be used to refer only to the client devices for which the authoring system 106 generates a set of preloaded classes. Other client devices are not the subject of this document.

It is also the role of the authoring system 106 to generate a JVM startup procedure 114, to be executed by the client devices whenever the JVM is to be loaded so as to execute a Java program or applet.

Overview of JVM Authoring System

The JVM authoring system 106 may be a typical computer workstation having one or data processing units (CPU's) 120, a user interface 122, memory 124, a network communications interface 126 for enabling communications with other devices via network 108, and one or more internal busses 128 for interconnecting the various components of system 106. Memory 124 typically includes high speed random access memory (RAM) and non-volatile memory such as a hard disk storage device.

In a preferred embodiment, memory 124 stores:
- a set of operating system procedures 130 for performing basis system functions;
- network access or communications procedures 132 for handling communications with other computers and devices; (as indicated above, this may a simple serial connection communication procedure, or may be a full network connectivity procedure);
- a source code repository 134 for storing the source code for procedures, including the source code 136 for the JVM and the source code 138 for the JVM startup procedure;
- a class filed repository 140, for storing Java language programs, including class files 142 and class libraries 144;
- an offline class loader 150, which is one of the tools used in a preferred embodiment of the present to preload a set of class files into the client devices, and in particular is used to generate a JVM offline class file 152 that contains a C language program;
- a local compiler 154, such as a C compiler, for compiling the JVM offline class file 152 into an executable file;
- a program executer 156 for executing the file generated by the local compiler 154 so as to generate a set of resource files 158, the nature of which will be explained in more detail below;
- a client device compiler 160 for compiling programs into a form suitable for execution as native code by the client devices;
- a load module 162 for loading into the client devices 102; the load module contains a set of resource files representing a set of preloaded class files;
- a compiled JVM program 164 for execution by the client devices; and
- a compiled JVM startup program 166 for execution by the client devices.

The origin, function and structure of many of the files and programs mentioned above will be described in more detail below in the section of this document entitled "Process for Generating Preloaded Class Files."

Overview of Client Device

A client device 102 may be, for example, a handheld person digital assistant such as the Palm (a trademark of 3COM) devices produced by 3COM (Palm Division) and other devices using the PalmOS operating system. While there are several versions of the Palm, which differ in terms of the amount of memory provided, the basic features and limitations of the Palm described herein are applicable to all the versions of this product line as of the first quarter of the year 2000.

The client device 102 will typically have a data processing unit (CPU) 220, a user interface 222, memory 224, a communications interface 226, such as network or serial or IR communications interface) for enabling communications with other devices (e.g., servers 104) via a network or other communication medium 108, and one or more internal busses 228 for interconnecting the various components of client device 102. Memory 224 typically includes high speed dynamic random access memory (DRAM) and/or static random access memory.

In a preferred embodiment, memory 224 stores:
- a set of operating system procedures (e.g., the PalmOS) 230 for performing basis system functions;
- network access procedures 232 for handling communications with other computers and devices;
- the load module 162 generated by the JVM authoring system;
- the Java Virtual Machine (JVM) 112, which is an program compiled into the native code of the client device;
- the JVM startup program 114, which is used to prepare the JVM for execution and to remediate for the lack of a virtual memory manager in the client device;
- JVM resources 234, which represent the preloaded class files that are ready for execution by the JVM without having to go through class verify and load steps;

a class repository 240, for storing Java language programs, including class files 242 downloaded from servers 104;

an application 252 that invokes the JVM 112, such as for executing a game program or any other type of program written in the Java language;

other application programs 254, such as an address book application, a calendar application, and so on;

a program executer 256 for executing the JVM 112, JVM startup procedure 114, and application programs 252, 254; and data files 270.

The application 252 is typically not part of the load module that includes the JVM and JVM resources. That is, applications 252 that invoke the JVM are typically loaded into the client device separately.

The application 252 may, in some embodiments, be a browser application that includes instructions for downloading HTML documents 262 from remotely located computers such as servers 104 and stored in an HTML document repository 260 in memory 224. The browser is typically an application compiled into the native code of the client device, but in an alternate embodiment the browser could be implemented as a Java bytecode program that is included in the preloaded classes in the load module 162. The downloaded documents may include documents having embedded therein references (e.g., HTML object tags or applet tags) to applets executable by the JVM 112, and the browser application includes instructions for displaying on a display in the user interface 222 the documents, including any images generated by executing the applet or applets therein.

Process for Generating Preloaded Class Files

Figure 3:
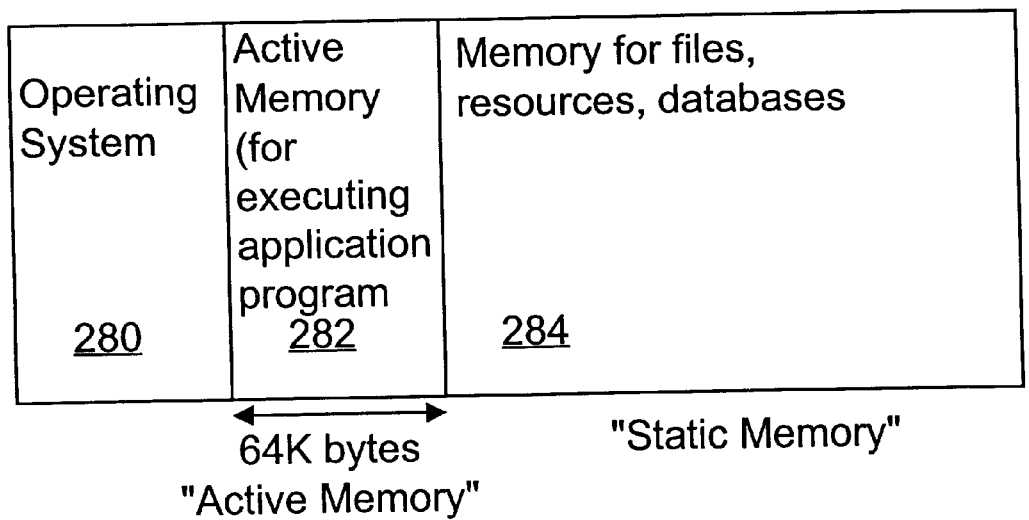
FIG. 3 is a memory map of a client device.

FIG. 3 shows a memory map of a client device. As shown, a first portion 280 of the device's memory is reserved for the operating system. A second portion 282, which in the Palm has a size ranging from 64K bytes to 256K bytes, depending on the version of the PalmOS in the device, is called the active memory (or alternately the dynamic memory), and is used to execute application programs. The remaining portion 284 of the device's memory, called static memory, is used to store files, database tables, and inactive applications. The address ranges for the various portions 280, 282, 284 of memory may differ from those shown in FIG. 3. For instance, the operating system portion 280 may be located at the highest addresses, instead of the lowest addresses in memory as indicated in FIG. 3. The code for an application program normally remains in static memory 284 (as one or more code resources) during execution of the application, while active memory 282 is used to store variables and temporary data structures used by the application.

The PalmOS supports two types of databases: record databases and resource databases. In a record database, such as a database used to store addresses for an address book application, each database entry is a single record. Applications and libraries are examples of resource databases. Each record and each resource is limited in size to 64K bytes in the PalmOS. On the other hand, a "file" to be stored in the PalmOS may contain multiple records and resources and its size may exceed 64K bytes.

Figure 4:
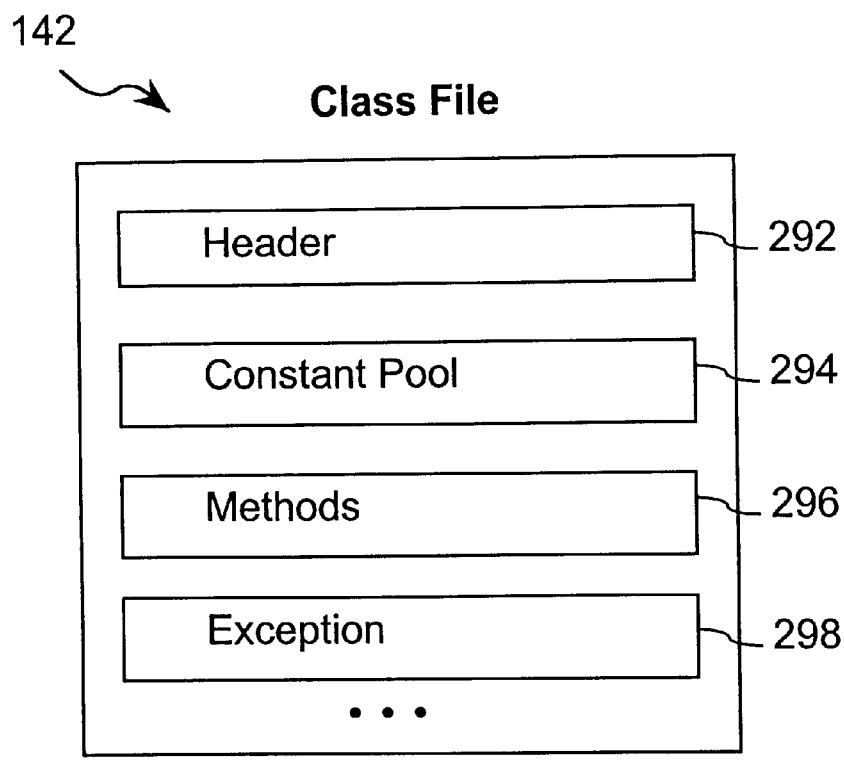
FIG. 4 depicts a class file data structure.

FIG. 4 shows that the main components of a Java class file 142 are a header 292, a constant pool 294, a set of methods 296 (which constitute the executable procedures of the class), and an exception table 298 (which indicates the code to be executed when certain unexpected conditions occur).

Figure 5:
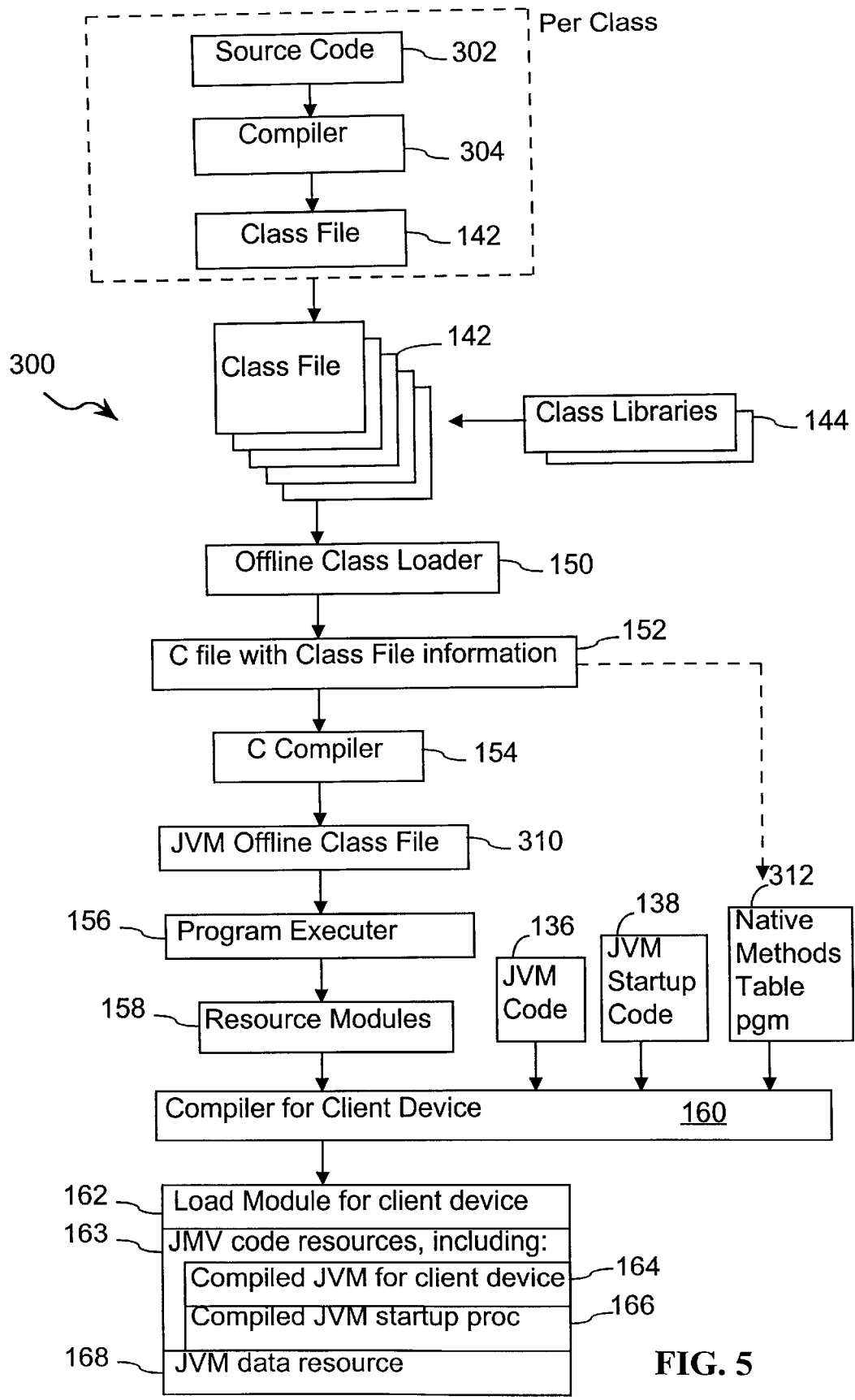
FIG. 5 is a flow chart of the process for generating a set of preloaded classes for use by the JVM in a client device.

FIG. 5 schematically depicts the steps of the process 300 for generating preloaded class files. The preloaded class files, once they have been installed on a client device, are available for immediate execution by the JVM in the client device, without having to undergo verification and loading. By preloading a set of class files, startup time of the JVM in the client device is significantly reduced, and the active (also called dynamic) memory requirements of the JVM are significantly reduced, because the preloaded classes are stored almost entirely in the static memory of the client device.

As a preliminary step, which is not necessarily performed by the authoring system, Java source code 302 for the methods of each class are compiled by a Java compiler 304 into a class file 142. The "compiler" 304 differs from a conventional compiler in that the resulting code is not object code for a particular processor, but rather consists of Java bytecode programs, called methods, that together form the methods of an object class. The Java compiler and Java class files are well known, and very widely used, and therefore need not be discussed in any detail here. What does need to be mentioned is that the basic set of classes that are preloaded into the Java Virtual Machine were also well established long before the development of the present invention, and that therefore the set of class files 142 that are to be preloaded may well be obtained from a source other than the authoring system.

The offline class loader 150 takes a set of class files 142 and automatically generates from those a C language program 152 that, when executed, builds a set of files 158 (called resource modules) for loading into the client devices. Of course, the program 152 could be written in any number of other languages, including Java, Pascal and C++, and thus the particular computer language used for program 152 is not critical. More importantly, the reason for building the files 158 using a program 152 instead of just directly generating the program is that the files 158 contain thousands of pointers, which would not only be difficult to compute by hand, but whose values would change any time a change is made to either the class files 142 or the data structures in the files 158. For instance, if a new optimization were implemented to make the methods represented by the data structures in files 158 more efficient when executed by the client devices, many or all of the pointers would have to be recomputed. By making the pointers into program statements, all pointer values are automatically resolved by the compiler 154 that is used to compile the program 152.

The content and structure of the program 152 will be explained indirectly, by explaining the content and structure of the resource files 158 generated by the program 152. To a very large extent, though, the program 152 consists of a set of data structure statements, which include information for each of the class files to be included in the set of preloaded classes. Elements in many of the data structure statements include references to elements of other data structures, and it is these references which are resolved into pointers by the compiler 154.

The compiler compiles the program 152 into a program herein called the JVM Offline Class File. A program executer executes the JVM Offline Class File 156, which produces a set of files herein identified as Resource Modules 158. The Resource Modules 158 may be stored in one or more files, since the number of files has no particular importance. Logically, however, the Resource Modules include several distinct modules, each of which will be discussed separately and will be stored, in effect, as a separate resource in the client devices.

Next, a compiler 160 for the client device is used to compile several sets of programs 136, 138, 312 so as to generate the programs and data structures to be loaded into the client devices. In one embodiment the compiler 160 is a C language compiler for the client device, which generates native object code executable by the client devices. The programs to be compiled include the code 136 for the Java Virtual Machine, which includes a set of subprograms including a program verifier, a class loader, a program interpreter, as well many other subprograms. The code 136 for the Java Virtual Machine also includes a set of fifty or so "native methods" which are methods for performing hardware specific operations, such as input/output operations, that must be executed by the client devices using native object code.

Another program compiled by compiler 160 is the JVM startup procedure 138, which is a special program that determines the current location of the resource modules at the time the JVM is to be executed, resolves and updates all the pointers in the resource modules so that they point to the proper locations in memory. The physical memory locations at which the resource modules are stored may change from one execution of the JVM to the next, and since the client devices do not have a virtual memory manager, the JVM startup procedure 138 is used to update all the absolute address pointers in the resource modules to take into account the current locations of the resource modules.

Yet another data structure compiled by the compiler 160 is a program 312 that defines a data structure called the Native Methods Table. The Native Methods Table program 312 is produced by the Offline Class Loader 150 and consists of a data structure 320 (FIG. 6) having two columns, one column indicating offsets into a Methods Table data structure, to be described below, and the other column indicating the memory locations of the corresponding native methods in the memory of the client device. The compiler 160 resolves the locations of the native methods and stores them in the resulting Native Methods Table 320 (FIG. 6), which is treated as a separately compiled program. More specifically, the Native Methods Table 320 is included by the compiler 160 in a "data resource" 168 associated with a set of JVM code resources 132; the data resource 168 includes all variables used by the compiled JVM and startup procedure.

The Resource Modules 158 are not compiled by the compiler 160. Rather, they are "included" in the module generated by the compiler 160, through the use of a directive to a linker, which is a part of the compiler 160. The module generated by the compiler 160 includes a Load Module 162 for the client device (which basically consists of the Resource Modules 158), a set of JVM code resources 163, which together include all the compiled code 164 for the JVM and the compiled code 166 for the JVM startup procedure, and an associated JVM data resource 168, which includes the compiled Native Methods Table 320. The JVM program is broken into a plurality of code resources (each of which is less than 64K bytes in size) because the total size of the JVM program exceeds the size limit on resources.

Eesource Modules and Key Data Structures

Referring to FIGS. 7, 8, 9A–9C and 10–15, the content and structure of the resource modules 162, 158 will be discussed next. The primary resource modules, each of which has a size less than the resource size limit (e.g., 64K bytes) of the client device are:

a table of contents 350, which is used to keep track of the client memory locations of the other modules;

an interned string table 352 for storing java string objects;

a UTF string table 354 for storing variable length strings (UTF strings);

a class table 356, for storing information about the preloaded classes;

method tables 358, for storing information about the methods of the preloaded classes;

field tables 360, for storing information about the fields of the preloaded classes;

a constant pool 362 for storing constant numeric values as well as pointers to fields, methods and Interned strings used by the methods of the preloaded classes;

handler tables 364 for storing information about exception handlers associated with the methods of the preloaded classes;

interface tables 366 for storing information about interfaces implemented by each of the preloaded Java classes;

a code module 368 for storing the bytecodes of the methods and exception handlers of the preloaded classes; and a Static Data table 370 for storing the values of variables allocated on a per-class basis, as opposed to variables allocated on a per-object instance basis.

As will become apparent from the further descriptions below, some, but not all of the resource modules have pointers to items in other ones of the modules. For example, the code resource 368, handler tables resource 364 and interface tables resource 366 do not have any pointers in them. The class table resource 356, methods table resource 358 are examples of resources that do have pointers. Furthermore, all of the modules other than the Table of Contents resource have items that are the targets of pointers in other ones of the modules, and even the Table of Contents can be set up to include a pointer to itself.

The Static Data table 370 is actually a place holder that does not need to be loaded into the client devices. Rather, the Static Data table is created and stored in the active memory of the client device during execution of the JVM. However, the Static Data table is included in the load module, at least during its initial creation, because the other modules include pointers into the various fields (i.e., entries) of the Static Data table 370. Pointers to items in the Static Data table require relocation or updating by the startup procedure, in the same manner as the pointers to other resources. Since the location of the Static Data table in the client device's active memory may change from one execution to the next, pointers to items in the Static Data table must be updated each time the JVM startup procedure is executed.

Figures 8, 9A:
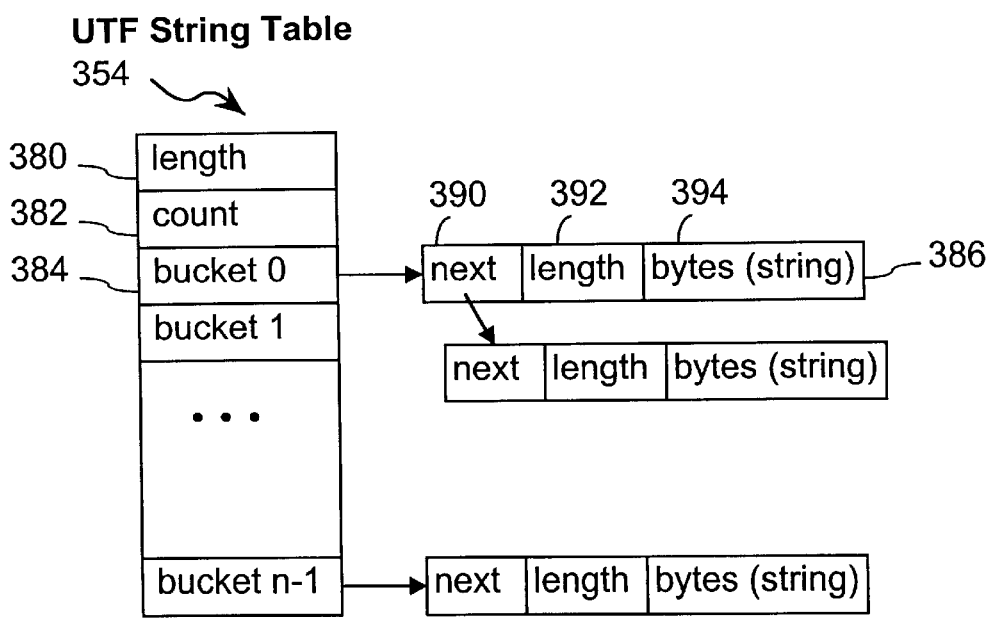
FIG. 8 depicts a Table of Contents data structure, which stores information about the resource modules
FIG. 9A depicts a UTF string table data structure.

The Table of Contents 350, shown in FIG. 8, is used to store the memory location and size of each of the resource modules. Initially, the address locations are an arbitrary set of values, for example, based on their locations within a load module file. Each time the JVM startup procedure is executed by a client device, the addresses in the Table of Contents are updated to indicate the current locations of those resources within the client device's memory. This procedure will be described in more detail below. In a preferred embodiment, the Table of Contents 350 furthermore stores a set of "key values," including pointers to the class table in the class table resource 356, the class block for the class called java.lang.Object (the top level class), the hash tables shown in FIGS. 9A, 9B and 10, and other key data structures.

The UTF String Table 354, as shown in FIG. 9A, is implemented using a hash table. The hash table contains a number of "buckets" into which strings are mapped by a corresponding hash function (which is included in the JVM). The hash table includes a header that includes a length value 380, which indicates the number buckets in the table, a count value 382, which indicates the number of UTF strings 386 in the table, and a set of buckets 384. Each bucket 384 contains a pointer to a linked list of zero or more UTF strings 386. The pointer in each bucket points to the first UTF string, if any, in the linked list. Each UTF string 386 includes a pointer 390 to a next UTF string, a length field 392 that indicates the length, measured as a number of bytes, in the string, and a bytes field 394 that stores the string itself.

Figure 9B:
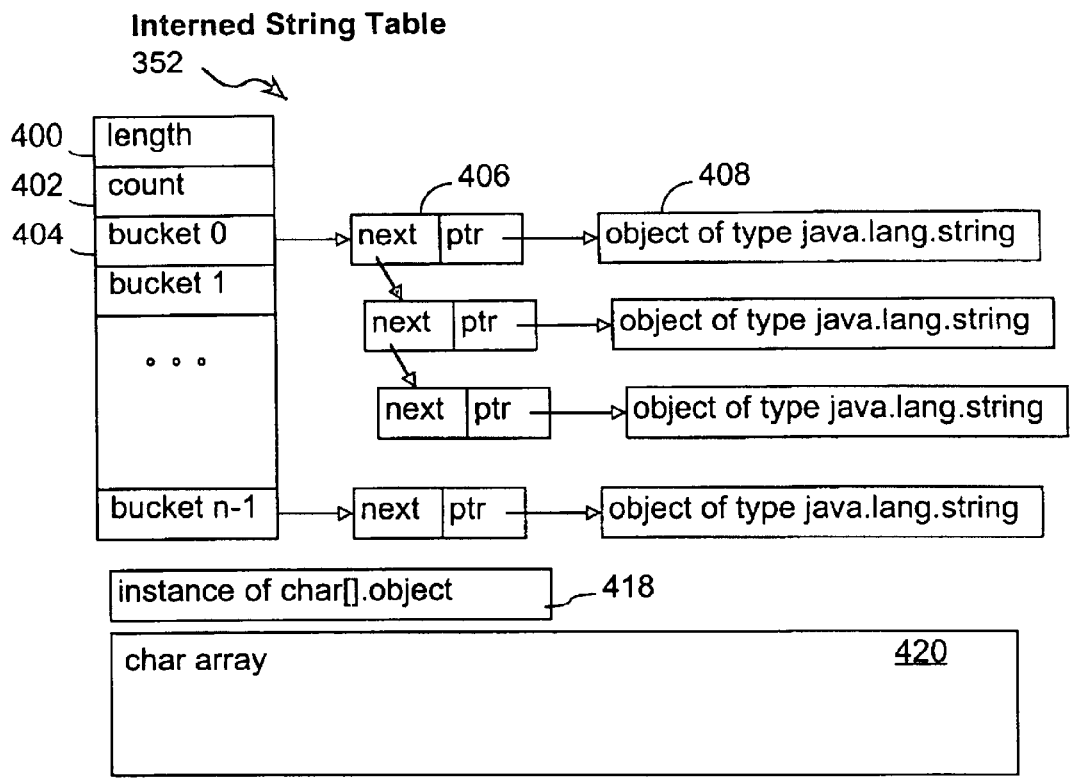
FIGS. 9B and 9C depicts an Interned string table data structure.
Figure 9C:
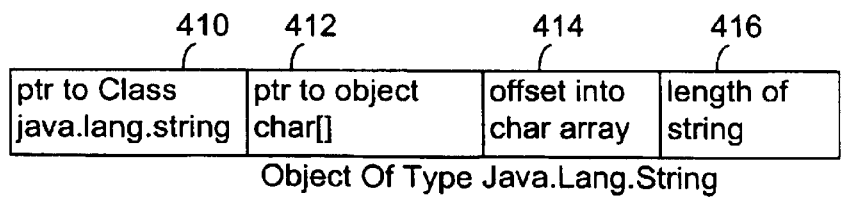

The Interned String Table 352 is similar in structure to the UTF String Table 354. In particular, the Interned String Table 352 as shown in FIG. 9B is implemented using a hash table. The hash table contains a number of "buckets" into which string objects are mapped by a corresponding hash function (which is included in the JVM). The hash table includes a header that includes a length value 400, which indicates the number buckets in the table, a count value 402, which indicates the number of strings objects 408 in the table, and a set of buckets 404. Each bucket 404 contains a pointer to a linked list of zero or more cells 406. The pointer in each bucket points to the first cell 406, if any, in the linked list. Each cell 406 includes a pointer to a next cell as well as a pointer to a string object 408 (or, to be more precise, an object of type "java.lang.String"). As shown in FIG. 9C, a string object 408 typically includes pointer 410 to the class "java.lang.String," a pointer to an instance of an object of type char[ ], and offset 414 into an array of characters, and an indicator 416 of the length of the string for the current object. The array of characters 420 stores all the strings of the string objects, with the location of each such string in the array being indicated by the offset and length fields 414, 416 of the respective string objects. To save space, only one char[ ] object instance 418 is stored and all the string objects point to this same, single instance of the char[ ] object 418.

Figure 10:
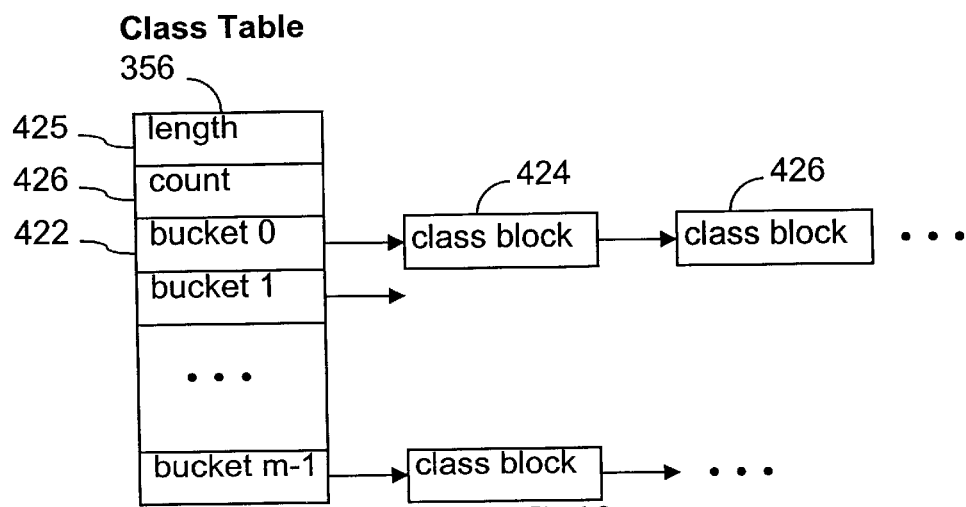
FIGS. 10 and 11 depicts a class table data structure.

The class table, as shown in FIG. 10, is another hash table having a number of buckets 422 that point to linked lists of class blocks 424. The table includes a length field 425 that indicates the number of buckets in the table and a count field 426 that indicates the number of class blocks in the table.

Figure 11:
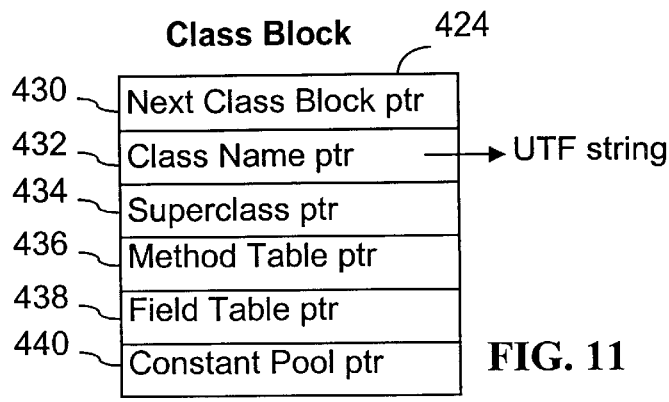

Each class block 424, as shown in FIG. 11, includes:
a pointer 430 to a next class block, if any;
a pointer 432 to the name of the class associated with the class block; the class name is stored in a UTF string at the address stored in this pointer;
a pointer 434 to the class block for the superclass of the class associated with the class block;
a pointer 436 to a method table 450, which in turn points to the methods of the class associated with the class block;
a pointer 438 to a field table 500, which defines the fields of the class associated with the class block; and
a pointer 440 to a constant pool table 510 for the class associated with the class block.

Figure 12:
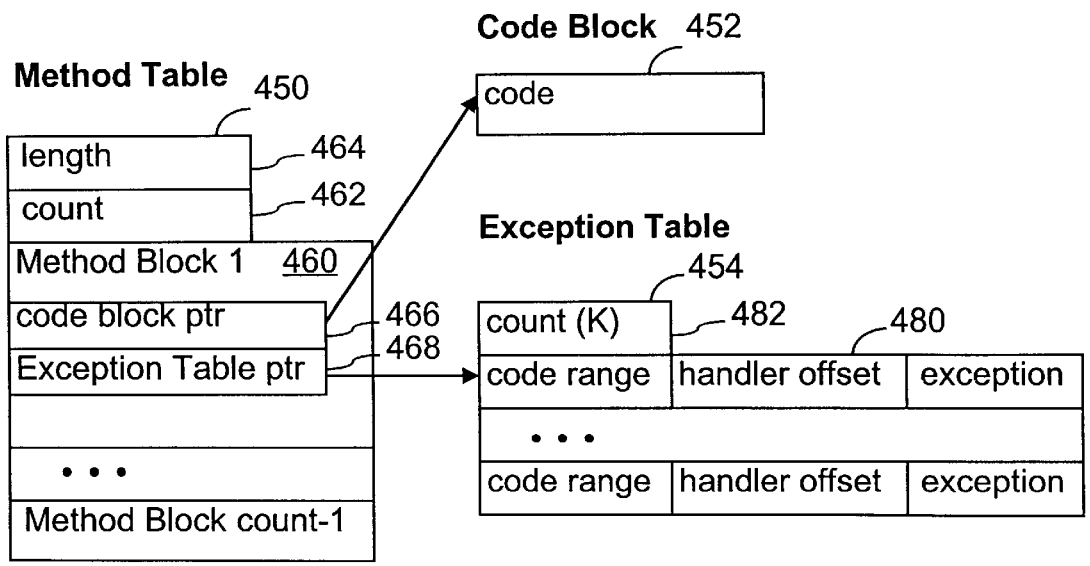
FIG. 12 depicts method table, code block and exception table data structures.

The Method Tables resource 358 stores a set of "C" Method tables 450 (see FIGS. 7 and 12), where "C" is the number of class files in the load module 162. Each class block 424 points to one of the method tables 450. Similarly, the Field Tables resource 360 stores a set of "C" field tables 500 (FIG. 13), the Constant Pool resource 362 stores a set of constant pool tables 520 (FIG. 14), the Handler Tables resource 364 stores a set of exception tables 454 (FIG. 12), and the Code resource 368 stores a set of code blocks 452 (FIG. 12).

Each Method Table 450 contains a set of method blocks 460, one for each method of the associated class. The table includes a count field 462 indicating the number of method blocks in the table and a length field 464 indicating the size of the table. Each method block includes a pointer 466 to a code block 452 and another pointer 468 to an exception table 454, as well as other information not relevant to the present discussion.

Each code block 452 contains an executable program (also called code, or executable instructions), which in the preferred embodiment is a java language bytecode program (i.e., method).

Each exception table 454 contains one exception handler entry 480 for each exception handler specified by a corresponding method. A count field 482 indicates the number of exception handler entries, and each entry 480 indicates a code range in the method (i.e., the first and last bytecodes) to which a particular handler is applicable, an offset value indicating the location of the exception handler in the code block for the method, and the type of exception(s) for which the exception handler is to be used.

Figure 13:
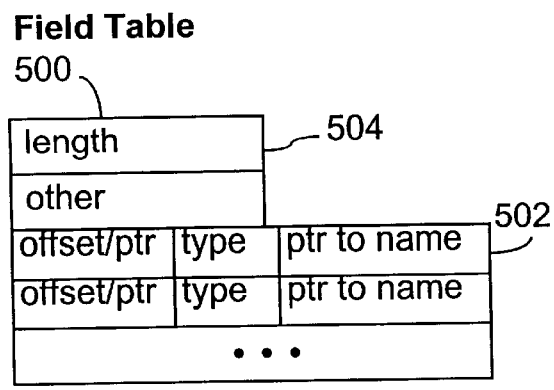
FIG. 13 depicts a field table data structure.

As shown in FIG. 13, each Field Table 500 of the Field Tables resource contains a set of field entries 502. Each field entry 502 includes an offset or pointer, the data type of the field, and a pointer to a UTF string that contains the name of the field. When the field corresponding to the field entry is a "per-object instance" field that is included in every object of the associated class (object type), the field entry contains an offset, and the offset indicates the position of the corresponding field in each object of the associated class. On the other hand, when the field corresponding to the field entry represents a "once per-class" variable that is stored in the Static Data array, the field entry contains a pointer to an entry in the Static Data array instead of an offset value. The Field Table 500 also includes a length field 504 that indicates the number of field entries 502 in the table.

Figure 14:
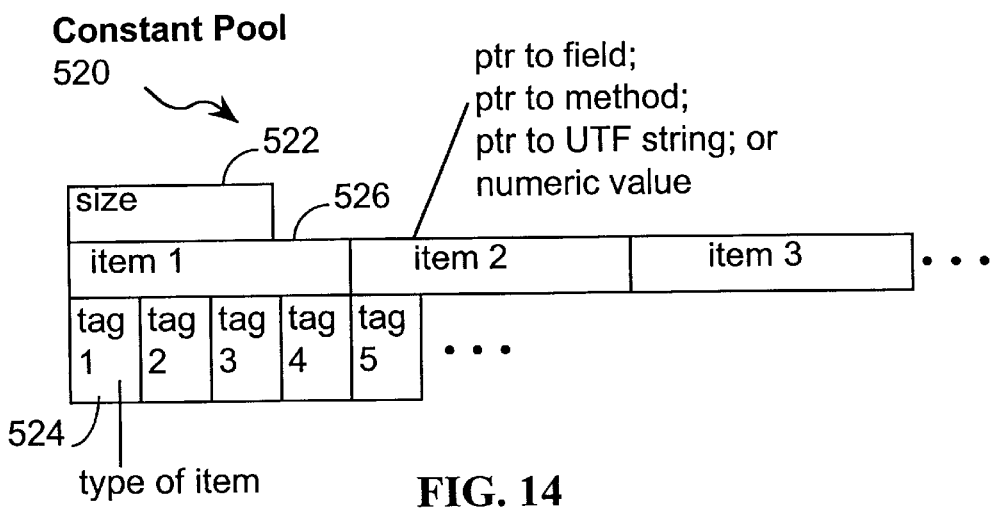
FIG. 14 depicts a constant pool data structure.

As shown in FIG. 14, the Constant Pool 520 for a particular class has a size field 522 indicating the number of items in the pool. Each item in the pool is represented by a 1-byte tag and a 4-byte "item". The tags 524 are stored in one array and the items in another, to satisfy addressing boundary requirements. Each tag 524 indicates the data type of a constant, while the corresponding item 526 is either a pointer to a field entry 502 in a field table 500, a pointer to a method (i.e., to a method block 460 in a method table 450), a pointer to a UTF String in the UTF String table 354, or a numeric value (e.g., an integer or floating point value). The data type specified by the tag 524 specifies whether the item 526 contains a numeric value or a pointer as well as the type of the pointer.

Process for Initializing and Launching Java Virtual Machine in Client Device

Figure 15:
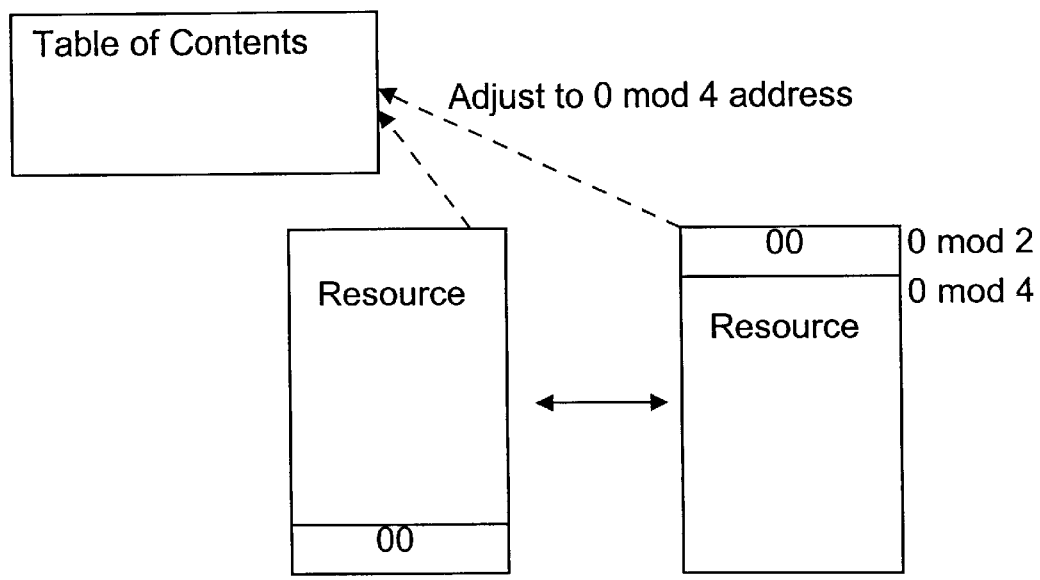
FIG. 15 is a conceptual representation of the process of adjusting the location of the first data structure in a resource so as to fall on 0 mod 4 address.

Referring to FIG. 15, each of the resource modules includes two bytes of null information at its end. The reason for this is as follows. The memory location of each module may change when the JVM is not executing. That is, the client device may relocate resources within its memory for various reasons. The problem with this is that the client device may store a resource at a location that is not a 0 mod 4 address (i.e., an address evenly divisible by four). More specifically, the starting address of a resource may be a 2 mod 4 address. However, the JVM relies on certain data structures being stored at locations which are 0 mod 4. This problem is solved by (A) storing two bytes of null information at either the end or beginning of each resource module, and (B) upon startup of the JVM, locking the location of the JVM resource modules, and (C) rotating these two bytes to the beginning or end of each resource module whenever necessary in order for the first byte of the non-null information in the resource module to be located at a 0 mod 4 address. Note that if a resource module was previously stored at a 2 mod 4 address (and hence had its null bytes moved to the front) and then is next stored at a 0 mod 4 address, the null bytes will need to be moved from the front to the back of the resource module.

Whenever the null bytes in a resource module are moved from back to front, the corresponding location value stored in the Table of Contents 350 is decreased by two, and whenever the null bytes in a resource module are moved from front to back, the corresponding location value stored in the Table of Contents 350 is increased by two. These adjustments to the Table of Contents enable the subsequent modification of pointers in the resource modules to be performed correctly.

Figure 16A:
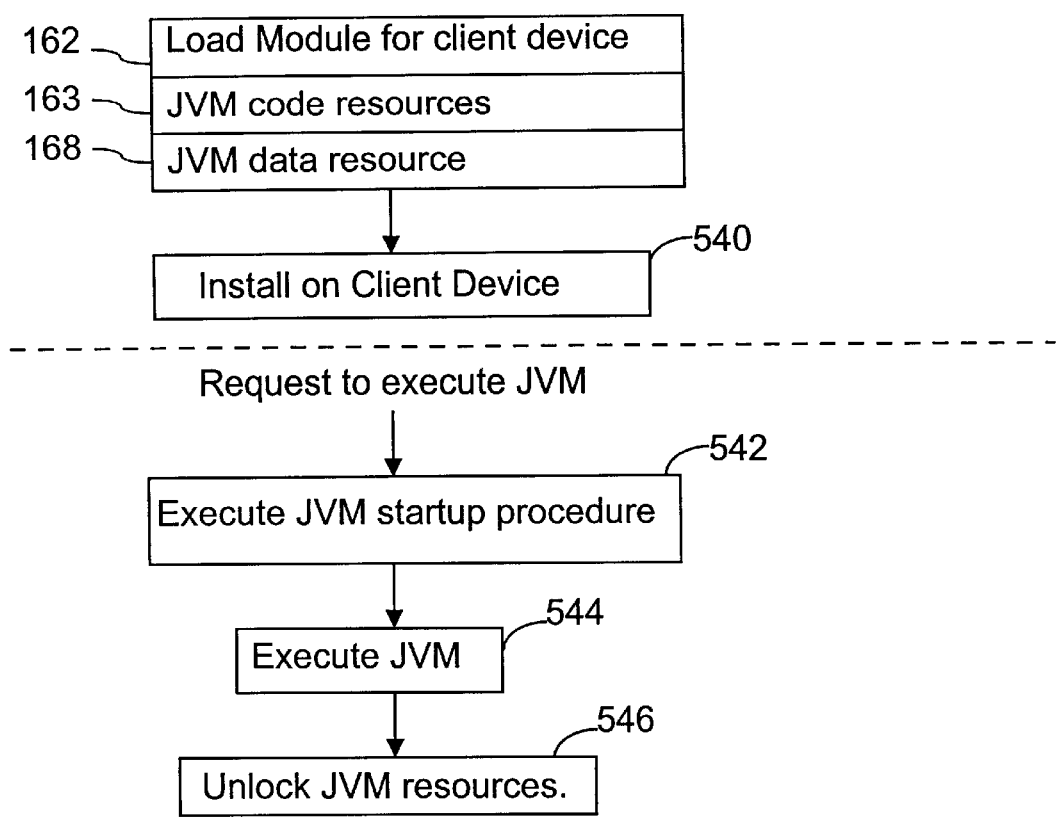
FIGS. 16A and 16B are a flow chart of the JVM startup procedure.
Figure 16B:
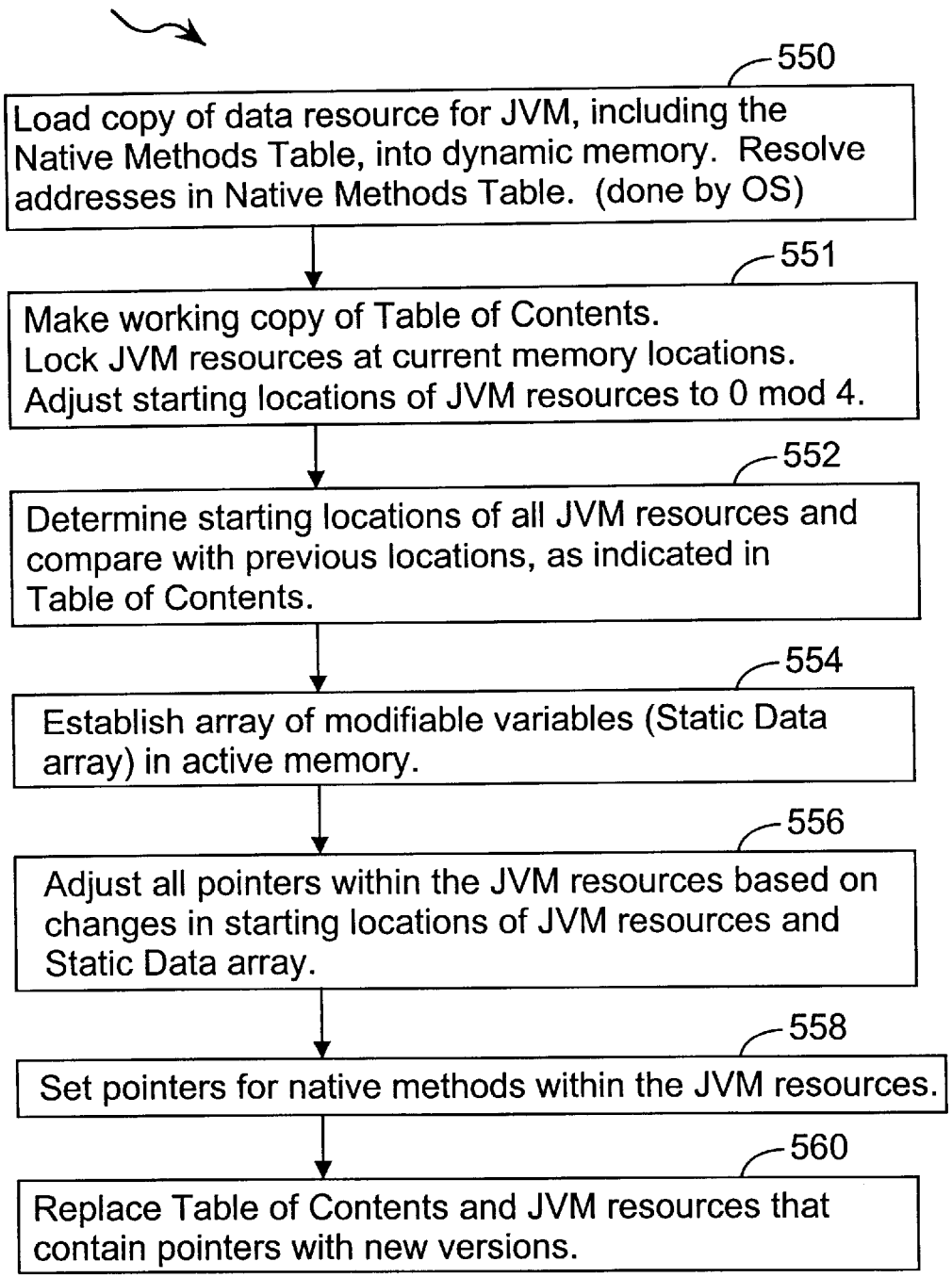

Referring to FIGS. 16A and 16B, prior to the execution of the JVM startup procedure, the JVM, the startup procedure and the resource modules must be installed on the client device (540), which means that they are stored in the memory of the device.

Whenever the JVM is to be executed by a client device, its execution is preceded by execution of the JVM startup procedure (542). Upon completion of the startup procedure, the JVM is executed (544), and upon completion of the JVM's execution all JVM resources which are locked by the startup procedure are unlocked (546).

The startup procedure is actually part of the same code resource as the JVM, herein called the JVM code resource, and furthermore the JVM includes a "data resource," herein called the JVM data resource. The JVM data resource represents all variables in the JVM, including the Native Methods Table. When the JVM startup procedure is to be executed, the PalmOS automatically copies the JVM data resource into active memory (550). That is, for any program to be executed by the Palm device, the PalmOS automatically copies the corresponding data resource into active memory.

Furthermore, while moving the data resource to active memory, the PalmOS automatically updates pointers within the data resource so as to point to the correct locations within the associated code resource(s). As a result, the copy of the Native Methods Table in active memory is automatically updated by the PalmOS to contain updated pointers to the native code methods within the JVM code resources.

The startup procedure creates a working copy of the Table of Contents (551). As indicated in FIG. 8, the working copy of the Table of Contents includes a "ΔLocation" column for storing the difference between the former and current locations of each of the resource modules.

Furthermore it locks each of the resources used by the JVM so that its location in memory cannot be changed until the resources are unlocked, after execution of the JVM has completed. The procedure then adjusts the locations of the two bytes of null information in each JVM resource module, but only if that is necessary to position the first non-null data structure in each such resource at a 0 mod 4 address, and adjusts the starting address of the module as recorded in the Table of Contents accordingly (551).

An array (called the Static Data array or the Static Data table) of modifiable per-class variables, associated with the preloaded classes, is established in active memory (552). The location of this array is noted and used during pointer adjustment step 556.

Next, the startup procedure determines the current starting locations of the JVM resources, compares them with the previous starting locations as indicated in the Table of Contents, and generates a ΔLocation value, equal to the difference between the current and former locations, for each of the JVM resource modules (554). If all the ΔLocation values are zero, indicating that none of the JVM resource modules were moved since the last execution of the JVM, then most of the work performed in step 556 (adjusting pointers) is skipped. It is noted that the Static Data array is one of the "resources" for which there is a row in the Table of Contents, even though this resource is regenerated with each execution of the JVM. The change in location of the Static Data array from one execution to the next is used to update pointers in the Field Tables resource to entries in the Static Data array (in step 556).

The step (556) of adjusting the pointers within the JVM resources, based on the changes in starting locations of the JVM resources, is the step which enables the JVM to execute in a device that lacks a virtual memory manager. The adjustment of the pointers is accomplished as follows. For the UTF string table 354 and Interned string table 352, the values of the pointers within these tables are adjusted by an amount equal to the change in location for each of these tables. For example, if the UTF string table 354 has moved by +1024 bytes, then all the pointers in this table are incremented by 1024. Within the Interned string table 352, the pointers 410 to the java.lang.String class are adjusted by the same amount as the ΔLocation for the Class table resource.

Within the Class table 356, Method Tables 450, Field Tables 500 and Constant Pools 520, each pointer is (A) checked to make sure that it points to a location within the appropriate resource, and (B) adjusted by the ΔLocation for that resource. The set of pointers to be adjusted are found by tracing through all the class blocks of the Class Table, and following the pointers therein so as to locate all the Method Tables, Field Tables and Constant Pools in the JVM resources, and then adjusting their respective pointers.

Only the Field Tables resource contains pointers to items in the Static Data array. These pointers are updated in accordance with the change in location (if any) of the Static Data array from the previous execution of the JVM to the current execution of the JVM. In a preferred embodiment, the JVM startup procedure (step 554) checks the ΔLocation value for all resources other than the Static Data array, and switches to a "fast" update process when all those ΔLocation values are equal to zero. In the fast update process, only the pointers in the Field Tables resource that point to the Static Data array are updated in step 556.

Pointers within the Method Tables to native methods are updated separately, in step 558, using values stored in the Native Methods Table. As described above, the pointers in the Native Methods Table are updated at step 550 to point to the current locations of the native methods in the Java code resources. The Native Methods Table contains one row for each native method, containing an offset into the Methods Table resource and a pointer to the native method. In step 558, for each row of the Native Methods Table 320, the pointer in the row is copied to the location in the Method Tables resource indicated by the offset value in that row. Step 558 is performed even when the ΔLocation values for all the resources noted in the Table of Contents are equal to zero.

It is noted here that in a preferred embodiment in which the client device is a Palm device, while the JVM resources are stored in the "static memory" of the client device, the contents of those resources can be overwritten through the use of appropriate operating system commands. While writing new values into the static memory requires the use of special operating system commands, and is more time consuming than normal writes to the active memory 282 (FIG. 3) of the client device, the pointer adjustment process is performed only once for each execution of the JVM startup procedure.

In a preferred embodiment, the pointer updates are made in working copies of the JVM resources. Whenever possible these working copies are stored in active memory, but typically limitations in the amount of active memory force at least some of the working copies to be stored in static memory. Working copies are not made of the JVM resources that do not have pointers in them. In step 560, the Table of Contents is finalized by adding the ΔLocation for each resource to its starting address. Then, for each JVM resource for which there is a working copy, the JVM resource is replaced with its working copy. The reason that the Table of Contents and other JVM resources are not changed until the very end of the startup procedure is that if the startup procedure were to be interrupted in mid-process, the contents of the Table of Contents and the JVM resources would be internally inconsistent and it might then be impossible to properly adjust all the pointers in the JVM resources so as to recover from the interruption of the startup procedure. In other words, leaving the Table of Contents and other JVM resources unchanged until the end minimizes the amount of time during which the contents of the JVM resources are internally inconsistent. This makes it much more likely that the startup procedure will be able to recover from a crash or other interruption of the startup process.

After the startup process is completed, the JVM is executed (544, FIG. 16A). The JVM may then execute a single applet, or may execute many Java programs before its own execution is halted. When the JVM's execution is completed, the JVM resources are unlocked, thereby enabling the operating system to move them to new locations in memory in accordance with its internal housekeeping policies.

Alternate Embodiments

The present invention can be implemented as a computer program product that includes a computer program mechanism embedded in a computer readable storage medium. For instance, the computer program product could contain the program modules shown in FIGS. 1 and 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of preparing a specified set of classes for preloading in client devices lacking a virtual memory manager, comprising:

converting the specified set of classes into a plurality of resource modules, a subset of the resource modules each including items that have pointers to items in other ones of the resource modules; each pointer specifying a memory address of the item being pointed to;

providing a compiled interpreter, for execution by the client devices; wherein the interpreter is for executing programs in a predefined computer language, and the specified set of classes including methods in the predefined computer language;

providing a compiled startup procedure, to be executed by the client devices when loading the interpreter for execution; the startup procedure for replacing pointers in the resource modules with updated pointers in accordance with actual memory locations of the resource modules in any particular one of the client devices; and generating a load module for loading into the client devices, the load module including the plurality of resource modules, the compiled interpreter and the compiled startup procedure.

2. The method of claim 1, wherein the resource modules include a class table resource module, a method table resource module, a field table resource module, a constant pool resource module and a string resource module, a class table resource module including pointers to items in the method table, field table and constant pool resource modules, the field table resource module including pointers to items in the string resource module, and the constant pool resource module including pointers to items in the field table resource module and items in the string resource module.

3. The method of claim 1, wherein the startup procedure includes instructions for positioning a first data structure in each of at least two of the resource modules in the subset at a 0 mod 4 address within any particular one of the client devices.

4. The method of claim 1, wherein the resource modules include a table of contents indicating a memory address for each of a second subset of the resource modules, the second subset including those of the resource modules pointed to by at least one of the pointers in the resource modules;

the startup procedure includes instructions for (A) determining a current memory address for each of the resource module in the second subset, determining a differential value for each resource modules in the second subset corresponding to a difference between the current memory address and the memory address indicated in the table of contents, and (B) adjusting at least a subset of the pointers in the resource modules in accordance with the differential values.

5. The method of claim 1, wherein the resource modules include a methods table module having pointers to code for methods of the specified set of classes, a subset of the pointers in the methods table pointing to native methods in the compiled interpreter.

6. A computer program product for use in conjunction with a computer system, the computer program product comprising a computer readable storage medium and a computer program mechanism embedded therein, the computer program mechanism comprising:

a class preloader for converting a specified set of classes into a plurality of resource modules, a subset of the resource modules each including items that have pointers to items in other ones of the resource modules; each pointer specifying a memory address of the item being pointed to;

a compiler for compiling an interpreter, for execution by client devices lacking a virtual memory manager, so as to generate a compiled interpreter; wherein the interpreter is for executing programs in a predefined computer language, and the specified set of classes including methods in the predefined computer language;

the compiler further for compiling a startup procedure, to be executed by the client devices when loading the interpreter for execution, so as to generate a compiled startup procedure, the startup procedure for replacing pointers in the resource modules with updated pointers in accordance with actual memory locations of the resource modules in any particular one of the client devices; and the compiler further for generating a load module for loading into the client devices, the load module including the plurality of resource modules, the compiled interpreter and the compiled startup procedure.

7. The computer program product of claim 6, wherein the resource modules include a class table resource module, a method table resource module, a field table resource module a constant pool resource module and a string resource module, a class table resource module including pointers to items in the method table, field table and constant pool resource modules, the field table resource module including pointers to items in the string resource module, and the constant pool resource module including pointers to items in the field table resource module and items in the string resource module.

8. The computer program product of claim 6, wherein the startup procedure includes instructions for positioning a first data structure in each of at least two of the resource modules at a 0 mod 4 address within any particular one of the client devices.

9. The computer program product of claim 6, wherein the resource modules include a table of contents indicating a memory address for each of a second subset of the resource modules, the second subset including those of the resource modules pointed to by at least one of the pointers in the resource modules;

the startup procedure includes instructions for (A) determining a current memory address for each of the resource modules in the second subset, determining a differential value for each resource module in the second subset corresponding to a difference between the current memory address and the memory address indicated in the table of contents, and (B) adjusting at least a subset of the pointers in the resource modules in accordance with the differential values.

10. The computer program product of claim 6, wherein the resource modules include a methods table module having pointers to code for methods of the specified set of classes, a subset of the pointers in the methods table pointing to native methods in the compiled interpreter.

11. A computer system for preparing a specified set of classes for preloading in client devices lacking a virtual memory manager, comprising:

a data processing unit;

memory for storing a specified set of classes, an interpreter, and a startup procedure;

a class preloader, executable by the data processing unit, for converting the specified set of classes into a plurality of resource modules, a subset of the resource modules each including items that have pointers to items in other ones of the resource modules; each pointer specifying a memory address of the item being pointed to;

a compiler, executable by the data processing unit, for compiling the interpreter, for execution by client devices lacking a virtual memory manager, so as to generate a compiled interpreter; wherein the interpreter is for executing programs in a predefined computer language, and the specified set of classes including methods in the predefined computer language;

the compiler further for compiling the startup procedure, to be executed by the client devices when loading the interpreter for execution, so as to generate a compiled startup procedure, the startup procedure for replacing pointers in the resource modules with updated pointers in accordance with actual memory locations of the resource modules in any particular one of the client devices; and the compiler further for generating a load module for loading into the client devices, the load module including the plurality of resource modules, the compiled interpreter and the compiled startup procedure.

12. The computer system of claim 11, wherein the resource modules include a class table resource module, a method table resource module, a field table resource module, a constant pool resource module and a string resource module, a class table resource module including pointers to items in the method table, field table and constant pool resource modules, the field table resource module including pointers to items in the string resource module, and the constant pool resource module including pointers to items in the field table resource module and items in the string resource module.

13. The computer system of claim 11, wherein the startup procedure includes instructions for positioning a first data structure in each of at least two of the resource modules at a 0 mod 4 address within any particular one of the client devices.

14. The computer system of claim 11, wherein the resource modules include a table of contents indicating a memory address for each of a second subset of the resource modules, the second subset including those of the resource modules pointed to by at least one of the pointers in the resource modules;

the startup procedure includes instructions for (A) determining a current memory address for each of the resource modules in the second subset, determining a differential value for each resource module in the second subset corresponding to a difference between the current memory address and the memory address indicated in the table of contents, and (B) adjusting at least a subset of the pointers in the resource modules in accordance with the differential values.

15. The computer system of claim 11, wherein the resource modules include a methods table module having pointers to code for methods of the specified set of classes, a subset of the pointers in the methods table pointing to native methods in the compiled interpreter.

16. A method of operating a client device lacking a virtual memory manager, comprising:

storing in memory in the client device a plurality of resource modules, the plurality of the resource modules representing a set of classes, a subset of the resource modules each including items that have pointers to items in other ones of the resource modules; each pointer specifying a memory address of the item being pointed to;

executing programs in a predefined computer language using a compiled interpreter, the programs executed including methods in the set of classes;

upon loading the interpreter and prior to executing programs using the compiled interpreter, executing a startup procedure so as to replace pointers in the resource modules with updated pointers in accordance with actual memory locations of the resource modules in the client device.

17. The method of claim 16, wherein the resource modules include a class table resource module, a method table resource module, a field table resource module, a constant pool resource module and a string resource module, a class table resource module including pointers to items in the method table, field table and constant pool resource modules, the field table resource module including pointers to items in the string resource module, and the constant pool resource module including pointers to items in the field table resource module and items in the string resource module.

18. The method of claim 16, wherein executing startup procedure includes positioning a first data structure in each of at least two of the resource modules at a 0 mod 4 address.

19. The method of claim 16, wherein
the resource modules include a table of contents indicating a memory address for each of a second subset of the resource modules, the second subset including those of the resource modules pointed to by at least one of the pointers in the resource modules;
the startup procedure includes instructions for (A) determining a current memory address for each of the resource modules in the second subset, determining a differential value for each resource modules in the second subset corresponding to a difference between the current memory address and the memory address indicated in the table of contents, and (B) adjusting at least a subset of the pointers in the resource modules in accordance with the differential values.

20. The method of claim 16, wherein the resource modules include a methods table module having pointers to code for methods of the specified set of classes, a subset of the pointers in the methods table pointing to native methods in the compiled interpreter.

21. A computer program product for use in conjunction with a computer system, the computer program product comprising a computer readable storage medium and a computer program mechanism embedded therein, the computer program mechanism comprising:
a load module, for loading into client devices lacking a virtual memory manager, the load module including:
a plurality of resource modules, the plurality of the resource modules representing a set of classes, a subset of the resource modules each including items that have pointers to items in other ones of the resource modules; each pointer specifying a memory address of the item being pointed to;
a compiled interpreter for executing programs in a predefined computer language; the set of classes including methods in the predefined computer language;
a startup procedure, to be executed by the client devices when loading the compiled interpreter for execution, the startup procedure for replacing pointers in the resource modules with updated pointers in accordance with actual memory locations of the resource modules in any particular one of the client devices.

22. The computer program product of claim 21, wherein the resource modules include a class table resource module, a method table resource module, a field table resource module, a constant pool resource module and a string resource module, a class table resource module structure including pointers to items in the method table, field table and constant pool resource modules, the field table resource module including pointers to items in the string resource module, and the constant pool resource module including pointers to items in the field table resource module and items in the string resource module.

23. The computer program product of claim 21, wherein the startup procedure includes instructions for positioning a first data structure in each of at least two of the resource modules at a 0 mod 4 address within any particular one of the client devices.

24. The computer program product of claim 21, wherein
the resource modules include a table of contents indicating a memory address for each of a second subset of the resource modules, the second subset including those of the resource modules pointed to by at least one of the pointers in the resource modules;
the startup procedure includes instructions for (A) determining a current memory address for each of the resource modules in the second subset, determining a differential value for each resource module in the second subset corresponding to a difference between the current memory address and the memory address indicated in the table of contents, and (B) adjusting at least a subset of the pointers in the resource modules in accordance with the differential values.

25. The computer program product of claim 21, wherein the resource modules include a methods table module having pointers to code for methods of the set of classes, a subset of the pointers in the methods table pointing to native methods in the compiled interpreter.

26. A client device, comprising:
a data processing unit;
memory for storing
an operating system lacking a virtual memory manager;
a plurality of resource modules, the plurality of the resource modules representing a set of classes, a subset of the resource modules each including items that have pointers to items in other ones of the resource modules; each pointer specifying a memory address of the item being pointed to;
a compiled interpreter, executable by the data processing unit, the interpreter for executing programs in a predefined computer language; the set of classes including methods in the predefined computer language;
a startup procedure, executable by the data processing unit, for execution by the client device when loading the compiled the for execution, the startup procedure for replacing pointers in the resource modules with updated pointers in accordance with actual memory locations of the resource modules in the client device.

27. The client device of claim 26, wherein the resource modules include a class table resource module, a method table resource module, a field table resource module, a constant pool resource module and a string resource module, a class table resource module including pointers to items in the method table, field table and constant pool resource modules, the field table resource module including pointers to items in the string resource module, and the constant pool resource module including pointers to items in the field table resource module and items in the string resource module.

28. The client device of claim 26, wherein the startup procedure includes instructions for positioning a first data structure in each of at least two of the resource modules at a 0 mod 4 address within any particular one of the client devices.

29. The client device of claim 26, wherein
the resource modules include a table of contents indicating a memory address for each of a second subset of the resource modules, the second subset including those of the resource modules pointed to by at least one of the pointers in the resource modules;

the startup procedure includes instructions for (A) determining a current memory address for each of the resource module in the second subset, determining a differential value for each resource module in the second subset corresponding to a difference between the current memory address and the memory address indicated in the table of contents, and (B) adjusting at least a subset of the pointers in the resource modules in accordance with the differential values.

30. The client device of claim 26, wherein the resource modules include a methods table module having pointers to code for methods of the set of classes, a subset of the pointers in the methods table pointing to native methods in the compiled interpreter.

31. The client device of claim 26, wherein the client device includes a display; and the memory further stores:

a browser application, executable by the client device, for loading from remotely located computers documents, including documents having embedded therein a reference to an applet executable by the interpreter, and for displaying on the display the document and images generated by executing the applet.

32. A computer data signal embodied in a carrier wave, comprising:

a load module, for loading into client devices lacking a virtual memory manager, the load module including:

a plurality of resource modules, the plurality of the resource modules representing a set of classes, a subset of the resource modules each including items that have pointers to items in other ones of the resource modules; each pointer specifying a memory address of the item being pointed to;

an interpreter for executing programs in a predefined computer language; the specified set of classes including methods in the predefined computer language;

startup procedure, to be executed by the client devices when loading the interpreter for execution, the startup procedure for replacing pointers in the resource modules with updated pointers in accordance with actual memory locations of the resource modules in any particular one of the client devices.

* * * * *

UNITED STATES PATENT AND TRADEMARK OFFICE
CERTIFICATE OF CORRECTION

PATENT NO. : 6,745,386 B1
DATED : June 1, 2004
INVENTOR(S) : Frank N. Yellin

It is certified that error appears in the above-identified patent and that said Letters Patent is hereby corrected as shown below:

Column 14,
Line 43, "module" should read -- modules --.
Line 44, "modules" should read -- module --.

Column 15,
Line 19, after "a field table resource module" insert -- , --.

Column 17,
Line 27, "modules" should read -- module --.
Line 65, delete "structure".

Column 18,
Line 46, "compiled the for" should read -- compiled interpreter for --.

Column 19,
Line 6, "module" should read -- modules --.

Column 20,
Line 14, delete "specified".
Line 17, "startup procedure," should read -- a startup procedure, --.

Signed and Sealed this

Thirty-first Day of August, 2004

JON W. DUDAS
*Director of the United States Patent and Trademark Office*